(12) United States Patent
Gaal et al.

(10) Patent No.: US 8,687,731 B2
(45) Date of Patent: Apr. 1, 2014

(54) UPLINK OPEN-LOOP SPATIAL MULTIPLEXING IN WIRELESS COMMUNICATIONS

(75) Inventors: Peter Gaal, San Diego, CA (US);
Xiliang Luo, San Diego, CA (US);
Wanshi Chen, San Diego, CA (US);
Juan Montojo, San Diego, CA (US);
Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 12/697,619

(22) Filed: Feb. 1, 2010

(65) Prior Publication Data
US 2010/0195759 A1 Aug. 5, 2010

Related U.S. Application Data

(60) Provisional application No. 61/149,209, filed on Feb. 2, 2009.

(51) Int. Cl.
*H04L 27/00* (2006.01)

(52) U.S. Cl.
USPC .............................. 375/295; 341/20; 341/173

(58) Field of Classification Search
USPC ......................................................... 375/295
See application file for complete search history.

(56) References Cited

U.S. PATENT DOCUMENTS

| | | | |
|---|---|---|---|
| 7,088,671 B1 * | 8/2006 | Monsen ........................ | 370/203 |
| 8,310,994 B2 | 11/2012 | Kwon et al. | |
| 2003/0011854 A1 * | 1/2003 | Kahn et al. ..................... | 359/173 |
| 2004/0022179 A1 * | 2/2004 | Giannakis et al. ............ | 370/207 |
| 2006/0193399 A1 * | 8/2006 | Katagiri et al. ............... | 375/308 |
| 2008/0095258 A1 | 4/2008 | She et al. | |
| 2008/0117999 A1 * | 5/2008 | Kadous et al. ................ | 375/267 |
| 2008/0240274 A1 * | 10/2008 | Han et al. ...................... | 375/260 |

(Continued)

FOREIGN PATENT DOCUMENTS

| CN | 101212281 A | 7/2008 |
|---|---|---|
| EP | 1914947 A1 | 4/2008 |

(Continued)

OTHER PUBLICATIONS

Section 6.3.4.2.2, 3GPP TS 36.211, V9.0.0 (Dec. 2009), 3rd Generation Partnership Project; Technical Specification Group Radio Access Network; Evolved Universal Terrestrial Radio Access (E-UTRA); Physical Channels and Modulation (Release 9), Dec. 2009.

(Continued)

*Primary Examiner* — Erin M. File
(74) *Attorney, Agent, or Firm* — Liem T. Do

(57) ABSTRACT

Systems and methodologies are described that facilitate cycling through precoders for transmitting wireless network communications in a time domain. The precoders can be cycled according to a precoder sequence for each data symbol transmission. When the last precoder is selected the cycle can begin again, a new precoder sequence can be received or defined, and/or the like. A precoder sequence related to a subset of precoders present in a wireless device can be defined sequentially, cyclically shifted according to an identifier or one or more communications parameters, randomly, pseudo-randomly according to an identifier or one or more communications parameters, and/or the like. In addition, the precoder sequence can be utilized to select a precoder for one or more retransmissions. Such cycling of precoders can increase transmit diversity.

53 Claims, 11 Drawing Sheets

(56) References Cited

U.S. PATENT DOCUMENTS

| | | | |
|---|---|---|---|
| 2008/0303701 A1 | 12/2008 | Zhang et al. | |
| 2009/0129259 A1* | 5/2009 | Malladi et al. | 370/210 |
| 2010/0034312 A1* | 2/2010 | Muharemovic et al. | 375/267 |
| 2010/0189191 A1 | 7/2010 | Taoka et al. | |
| 2010/0284484 A1 | 11/2010 | Jongren et al. | |
| 2011/0205994 A1* | 8/2011 | Han et al. | 370/329 |
| 2012/0082202 A1* | 4/2012 | Jongren et al. | 375/232 |
| 2012/0213310 A1* | 8/2012 | Ko et al. | 375/295 |

FOREIGN PATENT DOCUMENTS

| | | |
|---|---|---|
| EP | 2015503 A2 | 1/2009 |
| EP | 2169846 A1 | 3/2010 |
| JP | 2008104193 A | 5/2008 |
| RU | 2110148 C1 | 4/1998 |
| TW | I291450 B | 12/2007 |
| WO | 2006118434 A1 | 11/2006 |
| WO | WO2006118433 A1 | 11/2006 |
| WO | 2008156081 A1 | 12/2008 |
| WO | 2009002093 A2 | 12/2008 |

OTHER PUBLICATIONS

International Search Report and Written Opinion—PCT/US2010/022882—ISA/EPO—Jun. 16, 2010.

Nortel, "Rank-1 and Rank-2 Transmission for High Mobility UE", 3GPP Draft, R1-073977(Nortel-RANK1&2 Trans High Mobility UE), 3rd Generation Partnership Project (3GPP), Mobile Competence Centre, 650, Route Des Lucioles, F-06921 Sophia-Antipolis Cedex, France, vol. RAN WGI, no. Shanghai, China, 20071001, Oct. 1, 2007, XP050107535.

Samsung et al: "Further Considerations of CDD precoding for High-speed UEs" 3GPP Draft; R1-073566_CDD_High_Speed_V3, 3rd Generation Partnership Project (3GPP),Mobile Competance Centre;650, Route Des Lucioles; F-06921 Sophia-Antipolis Cedex;France, vol. RAN WGI,no. Athens,Greece;20070715, Aug. 15, 2007,XP050107171 [retrieved on Aug. 15, 2007].

LGE, "Uplink MIMO Transmission for LTE-Advanced", R1-082943, 3GPP TSG RAN1 meeting #54, Aug. 18, 2008.

Co-pending U.S. Appl. No. 12/026,370, filed Feb. 5, 2008.

Kobayashi K., et al., "MIMO Systems with Random Unitary Precoding," Technical Report of the Institute of Electronics, Information and Communication Engineers, Oct. 12, 2006, vol. 106, No. 305, pp. 25-29, RCS2006-137.

Motorola,Uplink SU-MIMO Design Options for LTE Advanced, 3GPP R1-090269, Jan. 16, 2009.

Nokia Siemens Networks et al: "UL Single User MIMO Schemes in LTE-Advanced" 3GPP Draft; R1-090727, 3rd Generation Partnership Project (3GPP), Mobile Competence Centre; 650, Route Des Lucioles; F-06921 Sophia-Antipolis Cedex; France, No. Athens, Greece; Feb. 3, 2009, XP050318594 [retrieved on Feb. 3, 2009] the whole document.

NTT DoCoMo et al: "Downlink MIMO Scheme for Shared Data Channel in E-UTRA" 3GPP Draft; R1-063310 DL MIMO Scheme, 3rd Generation Partnership Project (3GPP), Mobile Competence Centre; 650, Route Des Lucioles; F-06921 Sophia-Antipolis Cedex; France, vol. RAN WG1, No. Riga, Latvia; Nov. 2, 2006, XP050103755.

QUALCOMM Europe, CDD Based Precoding for DL MIMO, 3GPP TSG-RAN WG1 #48, R1-070655, Feb. 16, 2007.

Taiwan Search Report—TW099103111—TIPO—Apr. 11, 2013.

\* cited by examiner

UPLINK OPEN-LOOP SPATIAL MULTIPLEXING IN WIRELESS COMMUNICATIONS

CROSS-REFERENCE

This application claims the benefit of U.S. Provisional Application Ser. No. 61/149,209, filed Feb. 2, 2009, and entitled "A METHOD AND APPARATUS FOR UPLINK OPEN-LOOP SPATIAL MULTIPLEXING IN A WIRELESS COMMUNICATION SYSTEM," the entirety of which is incorporated herein by reference.

BACKGROUND

I. Field

The present disclosure relates generally to wireless communications and more specifically to uplink open-loop spatial multiplexing.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Moreover, mobile devices can include multiple antennas and can transmit uplink communications to access points using the multiple antennas. The mobile devices (or access points) can select specific precoding for the mobile devices in closed-loop multi-layer transmission to minimize cross layer interference. For example, an access point can feedback information regarding a desired precoding to the mobile device. In this regard, mobile devices can satisfy high data rate requirements of some wireless network configurations, such as LTE-Advanced.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating open-loop spatial multiplexing in uplink wireless communications while preserving a single carrier property for the uplink wireless communications. In one example, a device transmitting in a wireless network can cycle through available precoders over time to provide transmit diversity. For instance, the number of precoders can be fixed depending on a number of transmit antennas of the device. Moreover, for example, the precoders can be cycled at a given unit of time, such as a data symbol, a subframe, and/or the like.

According to related aspects, a method is provided that includes receiving a plurality of data symbols for transmitting over a wireless network and precoding one of the plurality of data symbols by using one of a plurality of available precoders. The method also includes selecting a next precoder from the plurality of available precoders specified in a precoder sequence for precoding a next data symbol in the plurality of data symbols.

Another aspect relates to a wireless communications apparatus. The wireless communications apparatus can include at least one processor configured to obtain a plurality of data symbols for transmitting over a wireless network and precode one of the plurality of data symbols by using one of a plurality of available precoders. The at least one processor is further configured to determine a next precoder from the plurality of available precoders specified in a precoder sequence for precoding a next data symbol in the plurality of data symbols. The wireless communications apparatus also comprises a memory coupled to the at least one processor.

Yet another aspect relates to an apparatus. The apparatus includes means for obtaining a data symbol for transmitting over a wireless network and means for selecting a precoder for precoding the data symbol according to a next precoder in a precoder sequence. The apparatus further includes means for precoding the data symbol according to the precoder.

Still another aspect relates to a computer program product, which can have a computer-readable medium including code for causing at least one computer to obtain a plurality of data symbols for transmitting over a wireless network and code for causing the at least one computer to precode one of the plurality of data symbols by using one of a plurality of available precoders. The computer-readable medium can also comprise code for causing the at least one computer to determine a next precoder from the plurality of available precoders specified in a precoder sequence for precoding a next data symbol in the plurality of data symbols.

Moreover, an additional aspect relates to an apparatus that includes a data symbol receiving component that obtains a data symbol for transmitting over a wireless network and a precoder selecting component that determines a precoder for precoding the data symbol according to a next precoder in a precoder sequence. The apparatus can further include a signal precoding component that precodes the data symbol or a representative signal according to the precoder.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
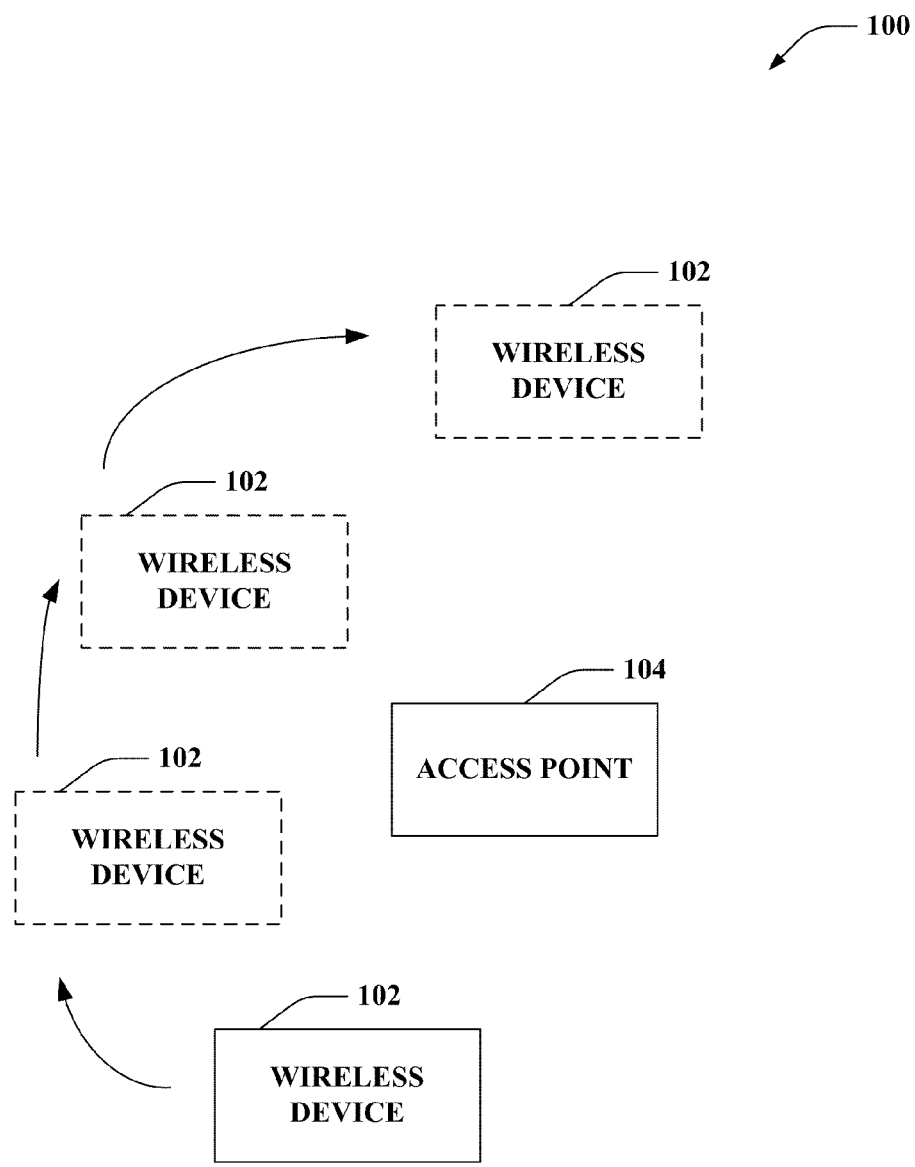
FIG. 1 is a block diagram of a system for cycling precoders to increase wireless device transmission diversity.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example wireless network 100 that facilitates high speed communications. Wireless network 100 includes a wireless device 102 that communicates with a disparate device, such an access point 104, to receive access to a core network or one or more components thereof (not shown). Wireless device 102 can be a mobile device, such as a UE, a portion thereof, and/or substantially any device that receives access to a wireless network. In addition, access point 104 can be a macrocell access point, femtocell or picocell access point, eNB, mobile base station, a disparate wireless device operating in a peer-to-peer mode, a portion thereof, and/or substantially any device that provides access to a wireless network.

For example, as depicted, wireless device 102 can travel over the wireless network 100 having disparate locations relative to access point 104. In this regard, channel conditions can change rapidly over communications channels between the wireless device 102 and access point 104. In closed-loop spatial multiplexing, access point 104 can specify to the wireless device 102 a precoding that optimizes receipt of wireless device 102 transmissions at the access point 104. A precoding can refer to applying an optimization to signal, such as beamforming, to weight the signal such that transmission power for the signal is maximized in one or more directions. In open-loop spatial multiplexing, however, no such precoding specification is available to wireless device 102.

Thus, to maintain transmit diversity in open-loop spatial multiplexing, wireless device 102 can cycle through available precoders over time when transmitting to access point 104, where precoders can be components that apply a precoding, as described above, or similar function to one or more signals (e.g. precode the signal) before or upon transmitting the signals. In one example, the number of precoders in wireless device 102 can be based on the number of transmit antennas. In any case, for example, wireless device 102 can utilize different precoders for consecutive data symbols (e.g., OFDM symbols in OFDM communications, SC-FDM symbols in SC-FDM communications, and/or the like), communication frames (e.g., a collection of consecutive or non-consecutive OFDM, SC-FDM, etc. symbols), subframes (e.g., a portion of one or more communication frames), a disparate ordering of consecutive or non-consecutive data symbols, and/or the like.

In addition, for example, a subset of available precoders can be cycled through from one data symbol to the next, and the subset can be defined according to one or more communication parameters, etc. Moreover, for example, the order of cycling can be a random, fixed, sequential, defined according to a reuse pattern, which can be based on one or more aspects of wireless device 102, such as an identifier, communications metrics, and/or the like. Additionally, for example, the cycling can be utilized for retransmission as well. Thus, transmission diversity is increased for single carrier uplink communications by cycling precoders over time. In this regard, fast channel update can be handled for improving reliability of data transmission for wireless devices traveling over a wireless network.

Figure 2:
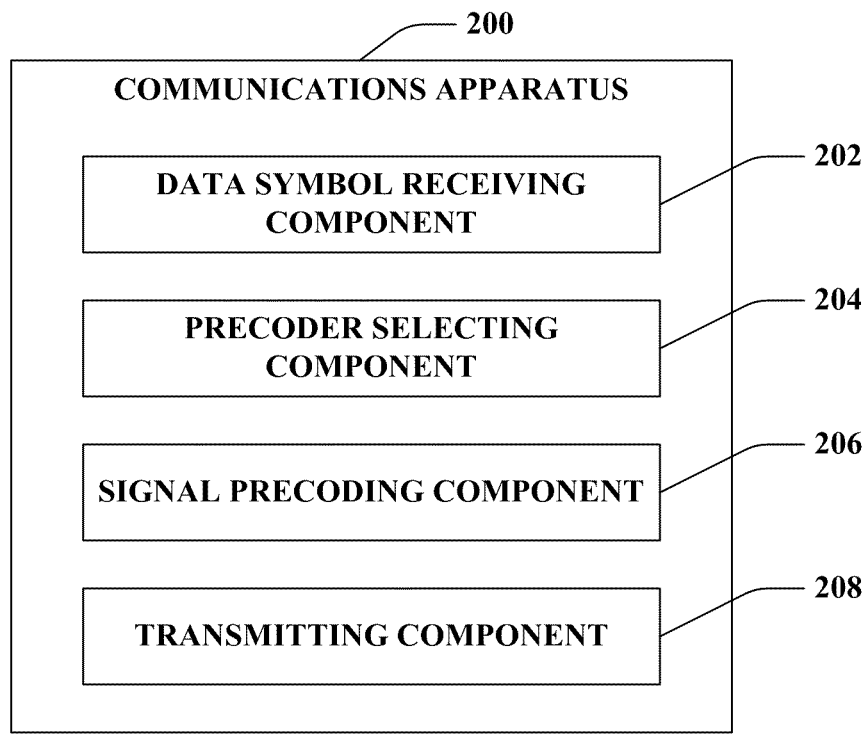
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device (e.g., a UE, modem or other tethered device, and/or the like), a portion thereof, an access point (e.g., a macrocell, femtocell, or picocell access point, a mobile access point, eNB, relay node, and/or the like), or substantially any device that communicates in a wireless network. The communications apparatus 200 can include a data symbol receiving component 202 that obtains a plurality of data symbols for transmission in a wireless network, a precoder selecting component 204 that determines one of a plurality of precoders for application to one or more of the data symbols, a signal precoding component 206 that applies the determined precoder to the data symbol or a representative signal, and a transmitting component 208 that transmits the precoded signal.

According to an example, data symbol receiving component 202 can obtain one or more data symbols for transmitting in a wireless network. For example, the data symbols can relate to control data, user plane data, etc. for providing to one or more network components of the wireless network (not shown). In addition, the data symbols can be OFDM symbols, SC-FDM symbols, and/or the like, in one example. Precoder selecting component 204 can determine a precoder of the communications apparatus 200 to apply to at least one of the data symbols. In one example, the communications apparatus 200 can include a plurality of precoders, which can be based on a number transmit antennas (not shown) employed by the communications apparatus 200, and can be used to beamform signals input into the precoders.

The precoder selecting component 204 can determine the precoder according to one or more precoder sequences. For example, the precoder selecting component 204 can cycle through available precoders, according to a precoder sequence, for consecutive data symbols. In this regard, the precoder sequence can be defined in sequential order, according to a received or generated pattern, according to a sequence or pattern cyclically shifted based on an identifier or other parameter, randomly, and/or the like. In this regard, the precoder selecting component 204 can determine a disparate precoder for a next data symbol to be different than for the current data symbol according to the precoder sequence.

Once the precoder is selected for a given data symbol, signal precoding component 206 precodes the signal using the precoder, as described. It is to be appreciated that other operations can be applied to the data symbol before or after applying precoding, such as modulation, multiplexing, encoding, and/or the like. Transmitting component 208 can transmit the precoded signal in a wireless network. As described, utilizing different precoders for consecutive data symbols in open-loop spatial multiplexing increases transmit diversity in the wireless network. In addition, as described, precoder selecting component 204 can cycle through precoders for retransmissions as well (e.g., in a hybrid automatic repeat/request (HARM) procedure).

For example, precoder selecting component 204 can select a precoder for retransmission to be the precoder after the last precoder utilized for the previous transmission according to the precoder sequence. In another example, precoder selecting component 204 can select a precoder with index k for retransmissions where k can be a function of the transmission or retransmission number. Moreover, for example, given a number of available precoders, precoder selecting component 204 can select from a subset of the available precoders. For instance, the precoder selecting component 204 can receive or otherwise determine the subset of precoders based at least in part on a configuration, specification, one or more parameters (e.g., cyclic prefix (CP) length, presence of a sounding reference signal (SRS), and/or the like).

Figure 3:
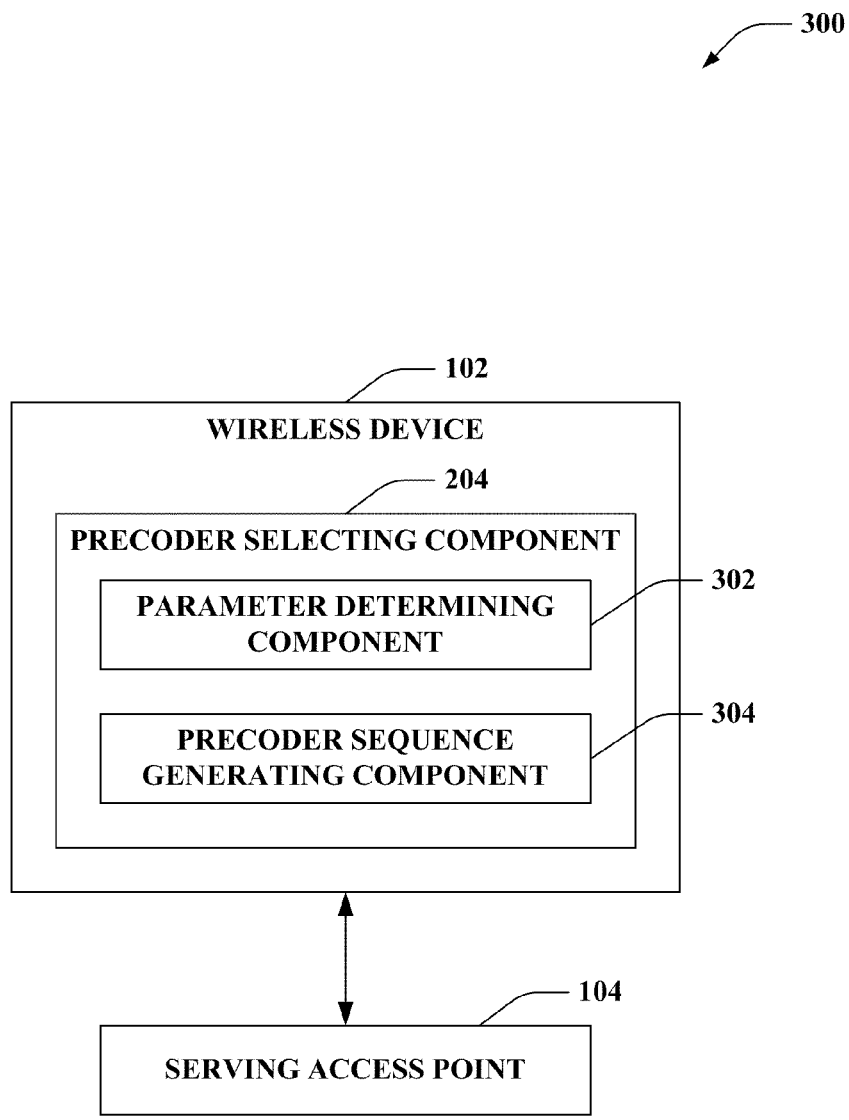
FIG. 3 illustrates a block diagram of an example system for receiving and/or generating precoder sequences for cycling through available precoders.

Now referring to FIG. 3, illustrated is a wireless communications system 300 that facilitates generating precoder sequences in a wireless network. System 300 includes a wireless device 102 that communicates with an access point 104 to receive access to a wireless network (not shown). As described, the wireless device 102 can be substantially any type of mobile device (including not only independently powered devices, but also modems, for example), UE, a portion thereof, etc., that receives access to a wireless network. Access point 104, as described, can be a macrocell access point, femtocell access point, picocell access point, relay node, mobile base station, a portion thereof, and/or substantially any device that provides access to a wireless network. Moreover, system 300 can be a MIMO system and/or can conform to one or more wireless network system specifications (e.g., EV-DO, 3GPP, 3GPP2, 3GPP LTE, WiMAX, etc.).

Wireless device 102 can include a precoder selecting component 204, which, as described, can determine a precoder to utilize for applying precoding to a specific data symbol. Precoder selecting component 204 can include a parameter determining component 302 that obtains one or more parameters regarding wireless device 102 and a precoder sequence generating component 304 that can create a precoder sequence for the wireless device 102 based on the one or more parameters or other considerations.

According to an example, upon wireless device 102 powering up, initiating connection with access point 104 or otherwise, parameter determining component 302 can measure or otherwise acquire one or more parameters to regarding wireless device 102. For example, the parameter can be an identifier of the wireless device 102, one or more communication metrics, such as signal-to-noise ratio (SNR), throughput, bandwidth, type, functionality, supported services, and/or the like. Based on the one or more parameters and/or on a configuration or specification, for example, precoder sequence generating component 304 creates a precoder sequence for the precoder selecting component 204. Precoder selecting component 204 can utilize the precoder sequence for cycling through precoders, as described above, used to transmit one or more consecutive data symbols.

For example, where wireless device 102 has N precoders, and N is a positive integer, precoder sequence generating component 304 can generate a sequential precoder sequence (0, 1, 2, . . . N), which precoder selecting component 204 can continually cycle through from one data symbol to the next. In this example, it is to be appreciated that parameter determining component 302 need not measure wireless device 102 parameters to generate the sequential precoder sequence. In another example, parameter determining component 302 can retrieve an identifier of wireless device 102 and/or one or more communication parameters. In an example, precoder sequence generating component 304 specifies a cyclically shifted sequential or non-sequential precoder sequence based on the identifier or communication parameters (e.g., based on a hash or similar function thereof).

In yet another example, precoder sequence generating component 304 can create a precoder sequence of a random pattern or a pseudo-random pattern based on the identifier or one or more communication parameters to provide further diversity. For example, a plurality of pseudo-random precoder sequences can be defined and assigned to precoder selecting component 204 based on a hash of an identifier or a range of the one or more communication parameters. In addition, for example, precoder sequence generating component 304 can define a new precoder sequence each time precoder selecting component 204 has cycled through a current sequence. Thus, consecutive precoder sequences can be different as well providing additional diversity.

It is to be appreciated, as described, that a subset of the N precoders can be utilized for generating precoder sequences. In this regard, precoder sequence generating component 304 can select the subset of the N precoders based at least in part on one or more configurations or parameters, such as CP length (e.g., of the transmission being precoded or previous transmissions by wireless device 102), presence of SRS (e.g., whether wireless device 102 transmits an SRS or whether the transmission to be precoded includes an SRS), and/or the like. In any case, as described, precoder selecting component 204 can choose a precoder for a given data symbol according to the precoder sequence such that the next data symbol uses the next precoder in the sequence. Wireless device 102 can utilize the selected precoder in precoding and transmitting the respective data symbol to access point 104 to provide diversity for open-loop spatial multiplexing, as described. In addition, as described, the precoder selecting component 204 can continue selection according to the sequence for retransmissions, receive a disparate precoder sequence from precoder sequence generating component 304 for retransmissions, and/or the like.

Figure 4:
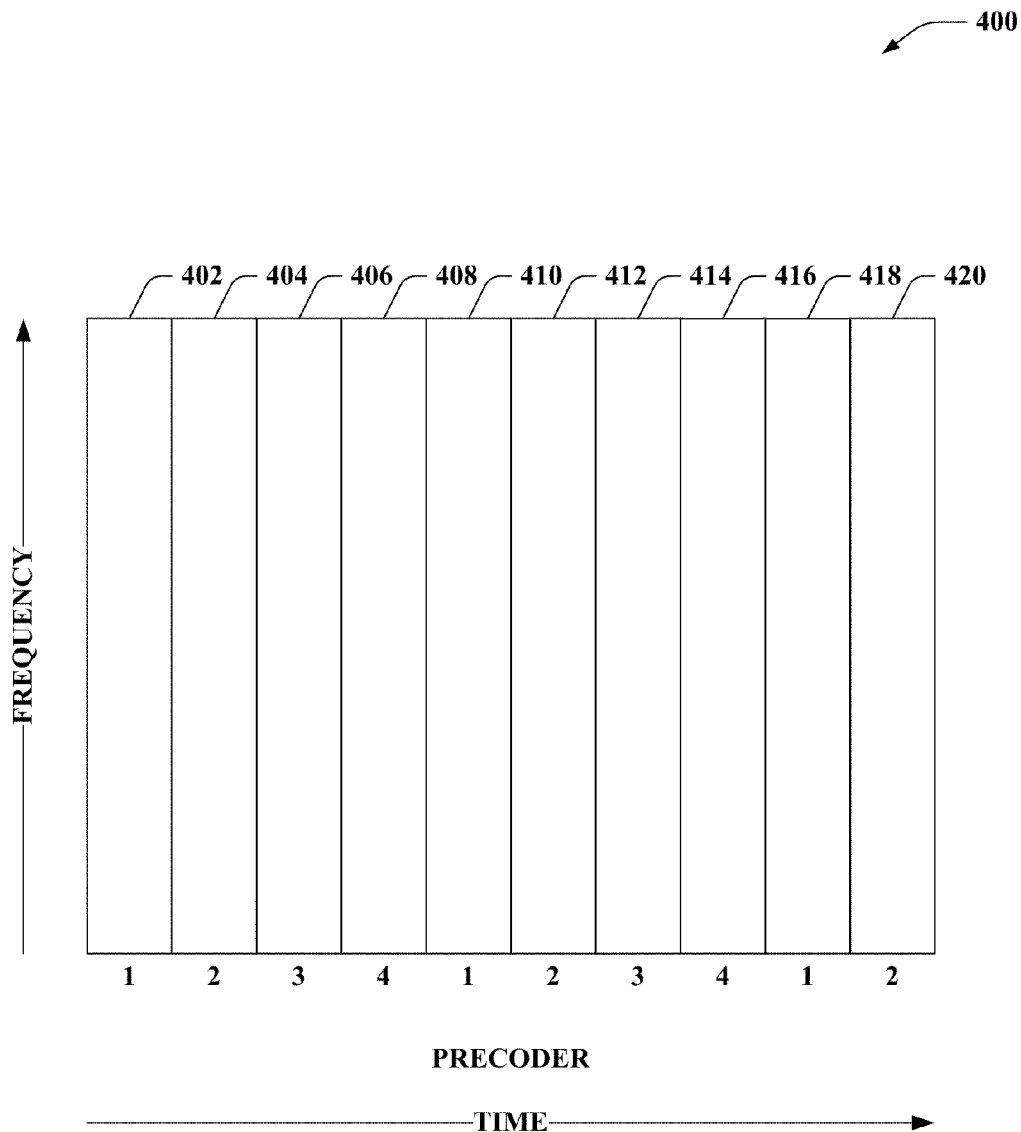
FIG. 4 illustrates an example communication frame or subframe and sample precoder assignments for related data symbols.

Turning to FIG. 4, an example wireless communication frame or subframe 400 is shown along with precoder assignments for data symbols thereof. Frame or subframe 400 comprises a plurality of consecutive data symbols 402, 404, 406, 408, 410, 412, 414, 416, 418, and 420, which can be contiguous or non-contiguous in the frame or subframe 400. In one example, the data symbols 402, 404, 406, 408, 410, 412, 414, 416, 418, and 420 can be OFDM symbols corresponding to assigned resources in a wireless network, which can be represented by a portion of frequency over time, SC-FDM symbols, etc. The symbols can each comprise a number of contiguous or non-contiguous frequency subcarriers for a given period of time.

As described, a wireless device can encode data for transmission in each data symbol. The data symbols 402, 404, 406, 408, 410, 412, 414, 416, 418, and 420 can be transmitted over time, and a precoder can be chosen for each data symbol to provide transmission diversity in open-loop spatial multiplexing for a single carrier system. As depicted, symbol 402 can be precoded using precoder 1. Symbol 404 can then be precoded using precoder 2, and so on such that precoders 1-4 are cycled through for consecutive data symbols. At symbol 410, precoder 1 can be utilized again and the cycle can continue. As described, such a sequential precoding sequence is but one of potentially limitless sequences, including random sequences, pseudo-random sequences, patterned sequences, cyclically shifted sequences, and/or the like.

Figure 5:
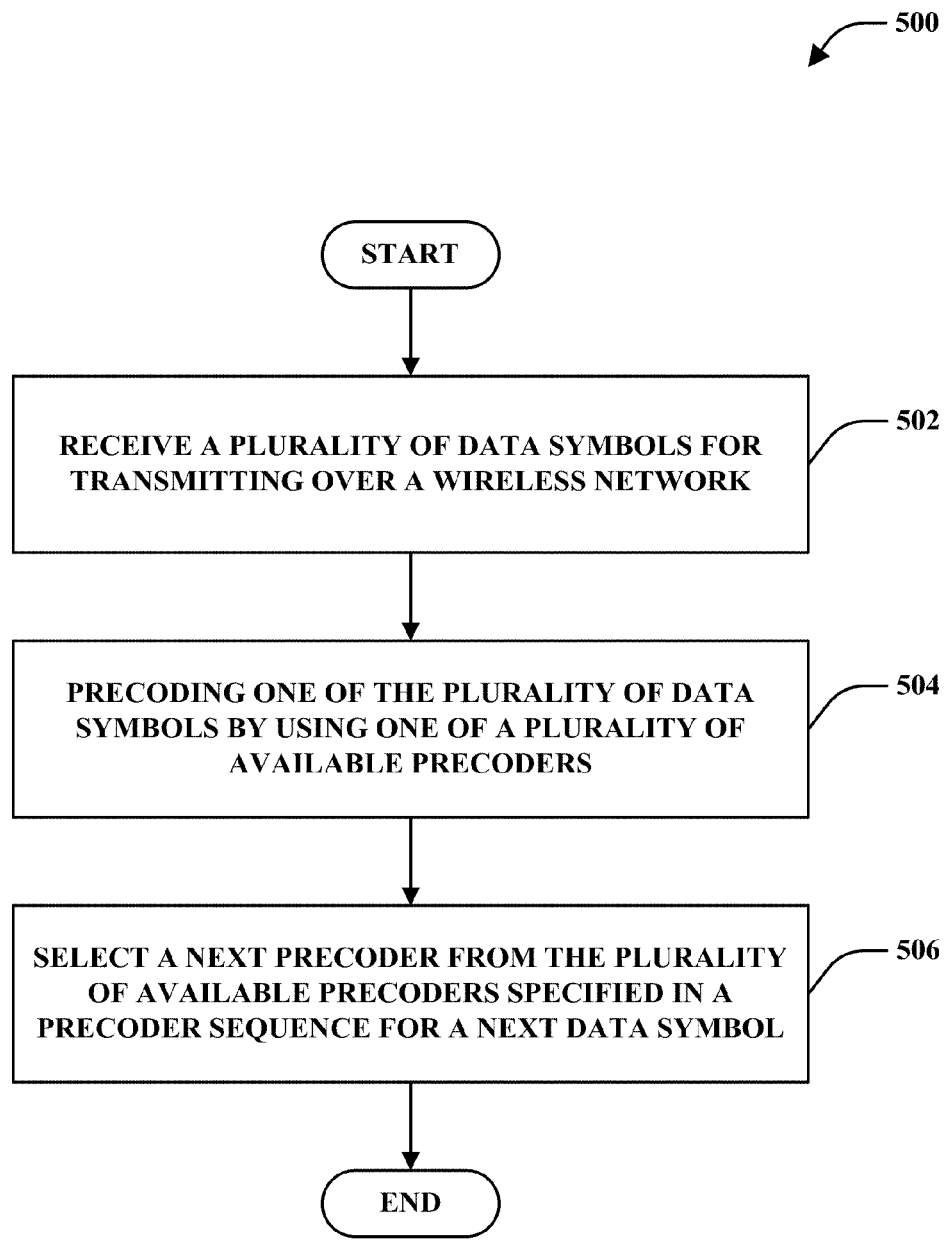
FIG. 5 is a flow diagram of an example methodology that selects precoders for precoding transmissions according to a precoder sequence.
Figure 6:
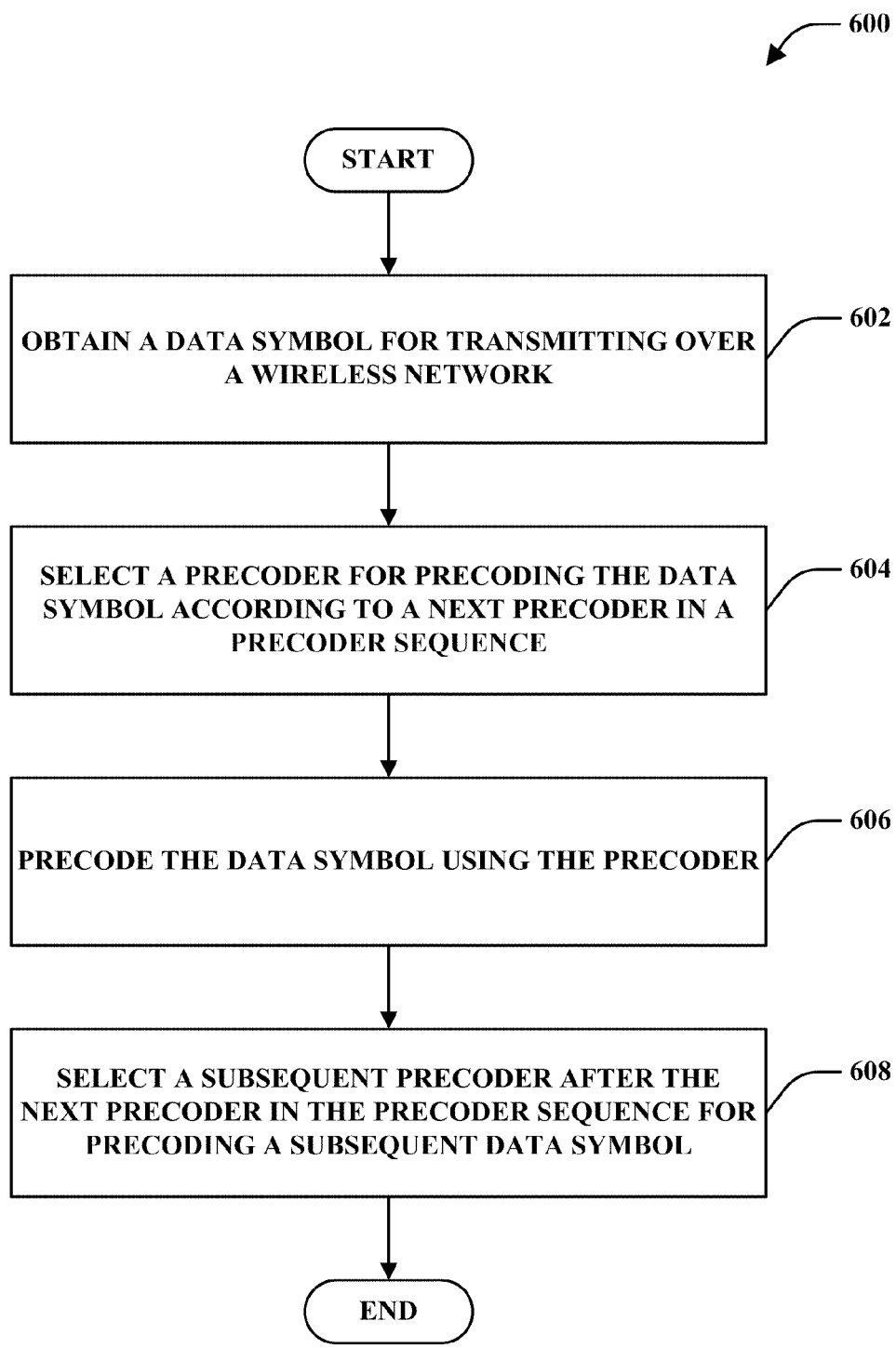
FIG. 6 is a flow diagram of an example methodology that selects subsequent precoders from a precoder sequence for precoding transmissions.

Referring now to FIGS. 5-6, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is an example methodology 500 for cycling through precoders for wireless communications in a time domain. At 502, a plurality data symbols can be received for transmitting over a wireless network. As described, the data symbols can be OFDM symbols, SC-FDM symbols, or similar data symbols that represent a portion of frequency over a portion of time. At 504, one of the plurality of data symbols can be precoded by using one of a plurality of available precoders. The plurality of available precoders, in one example, can be a subset of precoders present in a wireless device. At 506, a next precoder can be selected from the plurality of available precoders specified in a precoder sequence for a next data symbol. Thus, the available precoders are cycled through according to the precoder sequence. As described, the precoder sequence can be sequential, cyclically shifted according to an identifier or one or more communications parameters, random, pseudo-random and selected according to an identifier or one or more communications parameters, and/or the like. In addition, as described, the next data symbol can be a retransmission of the previously precoded data symbol. Using such a precoder sequence for consecutive data symbols provides additional transmit diversity, as described.

Turning to FIG. 6, an example methodology 600 is illustrated that facilitates selecting precoders for communicating data symbols in a wireless network. At 602, a data symbol can be obtained for transmitting over a wireless network. The data symbol, as described, can be an OFDM, SC-FDM, or similar symbol. At 604, a precoder can be selected for precoding the data symbol according to a next precoder in a precoder sequence. As described, the precoder sequence can be sequential, cyclically shifted according to an identifier or one or more communications parameters, random, pseudo-random and selected according to an identifier or one or more communications parameters, and/or the like. Once the precoder is selected, at 606 the data symbol can be precoded using the precoder. At 608, a subsequent precoder after the next precoder in the precoder sequence can be selected for precoding a subsequent data symbol. As described, in one example, the subsequent data symbol can be a retransmission of the data symbol.

It will be appreciated that, in accordance with one or more aspects described herein, inferences can be made regarding generating a precoder sequence, determining a next precoder for transmitting a data symbol, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
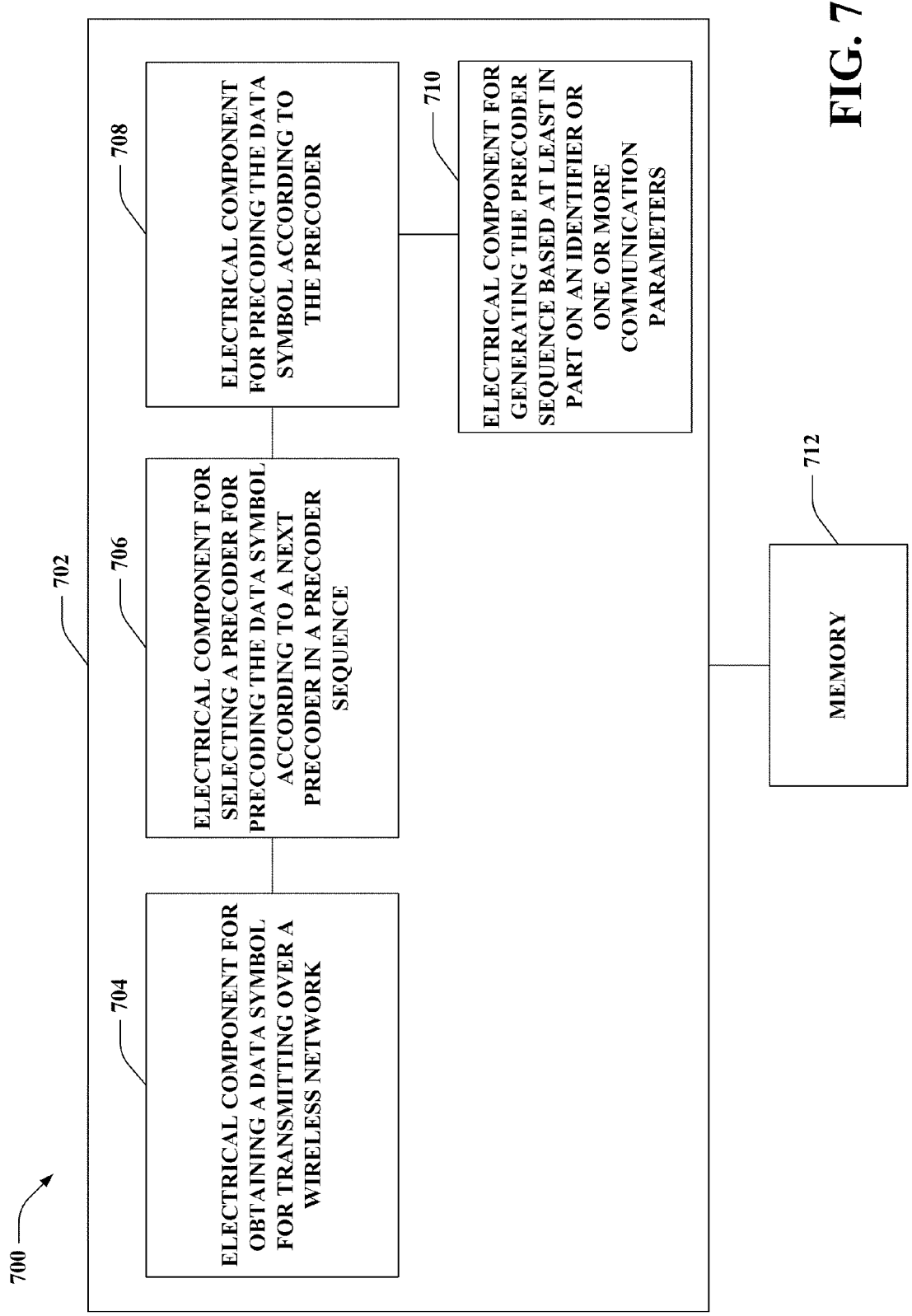
FIG. 7 is a block diagram of an example apparatus that facilitates precoding data symbols according to a precoder sequence.

With reference to FIG. 7, illustrated is a system 700 that cycles precoders for transmitting data symbols in a wireless network. For example, system 700 can reside at least partially within a base station, mobile device, etc. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for obtaining a data symbol for transmitting over a wireless network 704. Further, logical grouping 702 can comprise an electrical component for selecting a precoder for precoding the data symbol according to a next precoder in a precoder sequence 706. The precoder sequence can be received or generated based on one or more identifiers or communications parameters, for example. As described, the precoder sequence can be sequential, cyclically shifted according to an identifier or one or more communications parameters, random, pseudo-random and selected according to an identifier or one or more communications parameters, etc. Selecting precoders according to the precoding sequence, as described, can enhance transmission diversity.

In addition, it is to be appreciated that electrical component 706 can select subsequent precoders for subsequent consecutive or non-consecutive data symbols according to the precoder sequence, as described. Moreover, logical grouping 702 includes an electrical component for precoding the data symbol according to the precoder 708. In addition, logical grouping 702 can also include an electrical component for generating the precoder sequence based at least in part on an identifier or one or more communication parameters 710. Thus, electrical component 710 can produce a cyclically shifted sequence, a pseudo-random sequence, etc. according to an identifier or one or more communications parameters, as described. Additionally, system 700 can include a memory 712 that retains instructions for executing functions associated with electrical components 704, 706, 708, and 710. While shown as being external to memory 712, it is to be understood that one or more of electrical components 704, 706, 708, and 710 can exist within memory 712.

Figure 8:
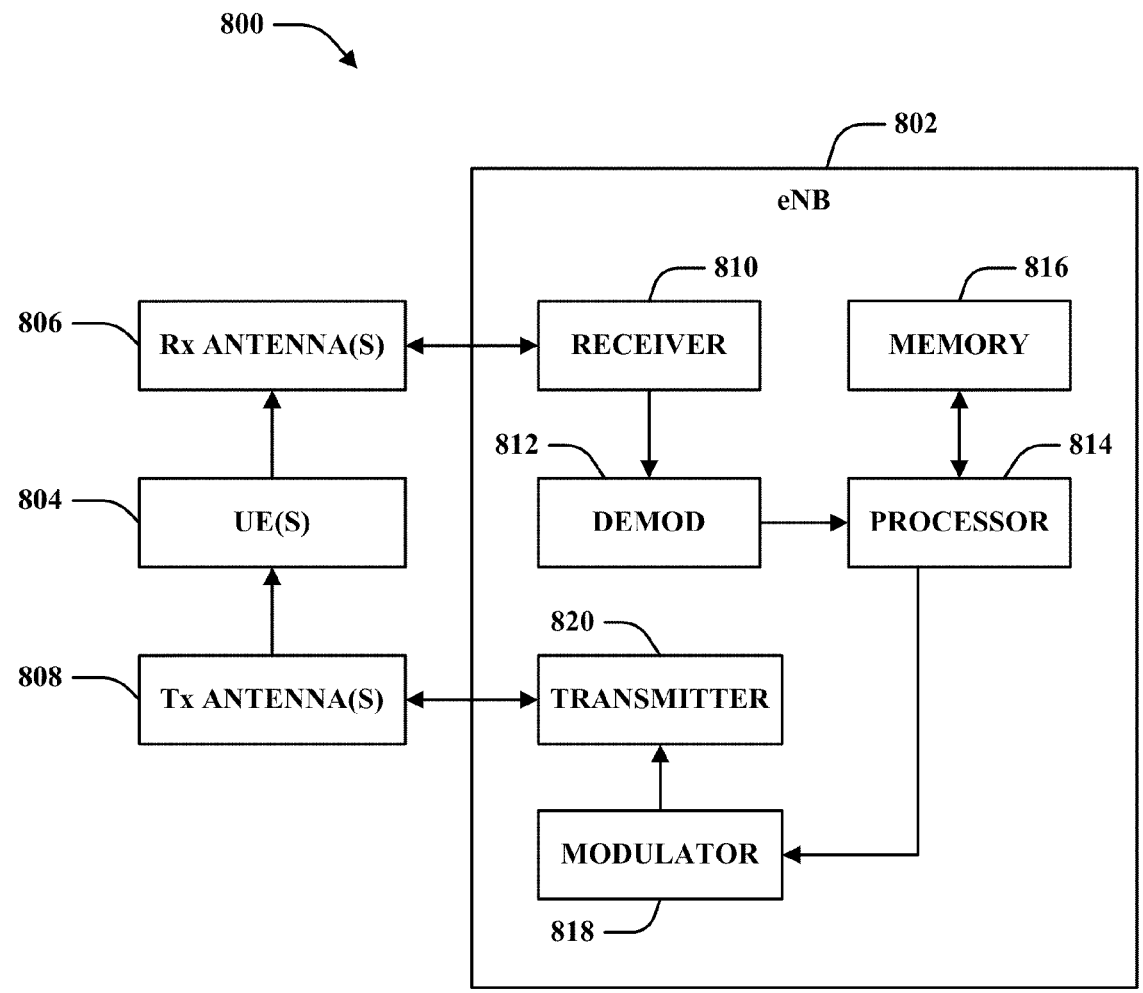
FIGS. 8-9 are block diagrams of example wireless communication devices that can be utilized to implement various aspects of the functionality described herein.

FIG. 8 is a block diagram of a system 800 that can be utilized to implement various aspects of the functionality described herein. In one example, system 800 includes a base station or eNB 802. As illustrated, eNB 802 can receive signal(s) from one or more UEs 804 via one or more receive (Rx) antennas 806 and transmit to the one or more UEs 804 via one or more transmit (Tx) antennas 808. Additionally, eNB 802 can comprise a receiver 810 that receives information from receive antenna(s) 806. In one example, the receiver 810 can be operatively associated with a demodulator (Demod) 812 that demodulates received information. Demodulated symbols can then be analyzed by a processor 814. Processor 814 can be coupled to memory 816, which can store information related to code clusters, access terminal assignments, lookup tables related thereto, unique scrambling sequences, and/or other suitable types of information. In one example, eNB 802 can employ processor 814 to perform methodologies 500, 600, and/or other similar and appropriate methodologies. eNB 802 can also include a modulator 818 that can multiplex a signal for transmission by a transmitter 820 through transmit antenna(s) 808.

Figure 9:
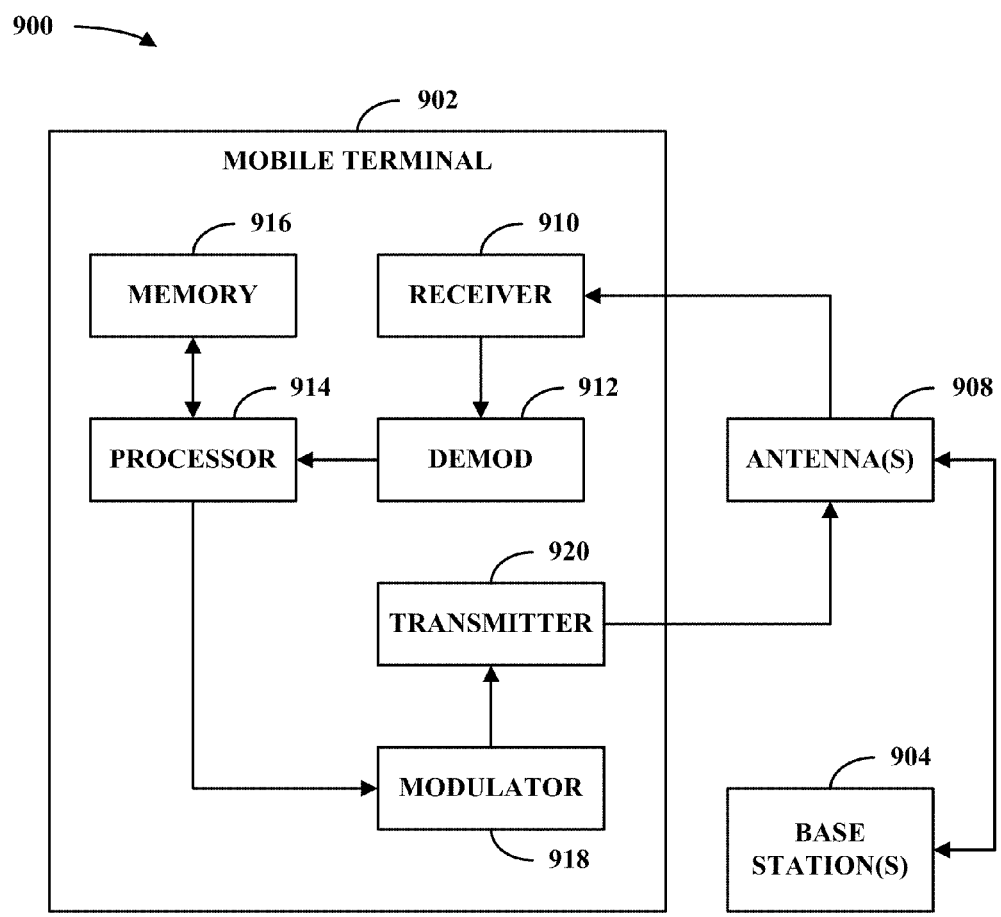

FIG. 9 is a block diagram of another system 900 that can be utilized to implement various aspects of the functionality described herein. In one example, system 900 includes a mobile terminal 902. As illustrated, mobile terminal 902 can receive signal(s) from one or more base stations 904 and transmit to the one or more base stations 904 via one or more antennas 908. Additionally, mobile terminal 902 can comprise a receiver 910 that receives information from antenna(s) 908. In one example, receiver 910 can be operatively associated with a demodulator (Demod) 912 that demodulates received information. Demodulated symbols can then be analyzed by a processor 914. Processor 914 can be coupled to memory 916, which can store data and/or program codes related to mobile terminal 902. Additionally, mobile terminal 902 can employ processor 914 to perform methodologies 500, 600, and/or other similar and appropriate methodologies. Mobile terminal 902 can also employ one or more components described in previous figures to effectuate the described functionality; in one example, the components can be implemented by the processor 914. Mobile terminal 902 can also include a modulator 918 that can multiplex a signal for transmission by a transmitter 920 through antenna(s) 908.

Figure 10:
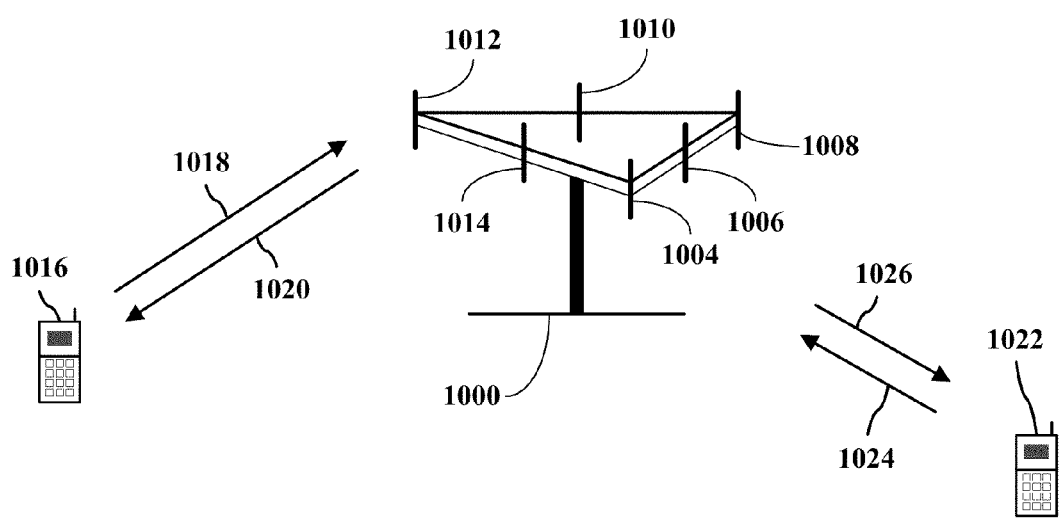
FIG. 10 illustrates an example wireless multiple-access communication system in accordance with various aspects set forth herein.

Referring now to FIG. 10, an illustration of a wireless multiple-access communication system is provided in accordance with various aspects. In one example, an access point 1000 (AP) includes multiple antenna groups. As illustrated in FIG. 10, one antenna group can include antennas 1004 and 1006, another can include antennas 1008 and 1010, and another can include antennas 1012 and 1014. While only two antennas are shown in FIG. 10 for each antenna group, it should be appreciated that more or fewer antennas may be utilized for each antenna group. In another example, an access terminal 1016 can be in communication with antennas 1012 and 1014, where antennas 1012 and 1014 transmit information to access terminal 1016 over forward link 1020 and receive information from access terminal 1016 over reverse link 1018. Additionally and/or alternatively, access terminal 1022 can be in communication with antennas 1006 and 1008, where antennas 1006 and 1008 transmit information to access terminal 1022 over forward link 1026 and receive information from access terminal 1022 over reverse link 1024. In a frequency division duplex system, communication links 1018, 1020, 1024 and 1026 can use different frequency for communication. For example, forward link 1020 may use a different frequency then that used by reverse link 1018.

Each group of antennas and/or the area in which they are designed to communicate can be referred to as a sector of the access point. In accordance with one aspect, antenna groups can be designed to communicate to access terminals in a sector of areas covered by access point 1000. In communication over forward links 1020 and 1026, the transmitting antennas of access point 1000 can utilize beamforming in order to improve the signal-to-noise ratio of forward links for the different access terminals 1016 and 1022. Also, an access point using beamforming to transmit to access terminals scattered randomly through its coverage causes less interference to access terminals in neighboring cells than an access point transmitting through a single antenna to all its access terminals.

An access point, e.g., access point 1000, can be a fixed station used for communicating with terminals and can also be referred to as a base station, an eNB, an access network, and/or other suitable terminology. In addition, an access terminal, e.g., an access terminal 1016 or 1022, can also be referred to as a mobile terminal, user equipment, a wireless communication device, a terminal, a wireless terminal, and/or other appropriate terminology.

Figure 11:
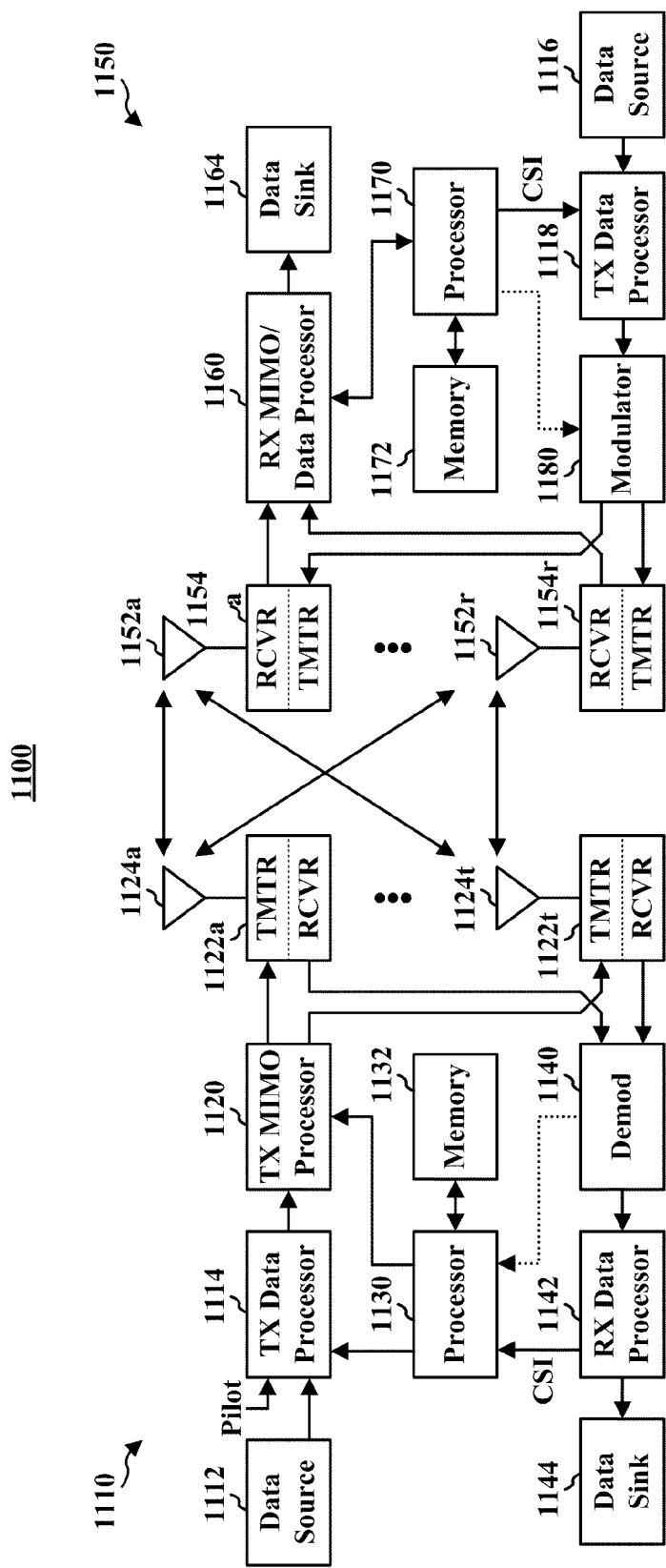
FIG. 11 is a block diagram illustrating an example wireless communication system in which various aspects described herein can function.

Referring now to FIG. 11, a block diagram illustrating an example wireless communication system 1100 in which various aspects described herein can function is provided. In one example, system 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX MIMO processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX MIMO/ data processor 1160 can then process each symbol stream at least in part by demodulating, deinterleaving, and decoding each detected symbol stream to recover traffic data for a corresponding data stream. Thus, the processing by RX MIMO/data processor 1160 can be complementary to that performed by TX MIMO processor 1120 and TX data processor 1118 at transmitter system 1110. RX MIMO/data processor 1160 can additionally provide processed symbol streams to a data sink 1164.

In accordance with one aspect, the channel response estimate generated by RX MIMO/data processor 1160 can be used to perform space/time processing at the receiver, adjust power levels, change modulation rates or schemes, and/or other appropriate actions. Additionally, RX MIMO/data processor 1160 can further estimate channel characteristics such as, for example, signal-to-noise-and-interference ratios (SNRs) of the detected symbol streams. RX MIMO/data processor 1160 can then provide estimated channel characteristics to a processor 1170. In one example, RX MIMO/data processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
receiving a plurality of data symbols for transmitting over a wireless network;
precoding one of the plurality of data symbols in a symbol period by using one of a plurality of precoders;
receiving a precoder sequence that specifies a pseudo-random order of the plurality of precoders; and
selecting a next precoder from the plurality of precoders specified in the precoder sequence for precoding a next data symbol of the plurality of data symbols in a next symbol period.

2. The method of claim 1, wherein the receiving the precoder sequence includes receiving the precoder sequence that specifies an order of the plurality of precoders based at least in part on an identifier or one or more communication parameters.

3. The method of claim 2, wherein the receiving the precoder sequence includes generating the precoder sequence based at least in part on the identifier or the one or more communication parameters.

4. The method of claim 1, further comprising receiving the precoder sequence that specifies a sequential order of the plurality of precoders.

5. The method of claim 4, wherein the receiving the precoder sequence includes receiving the precoder sequence that specifies an order of the plurality of precoders that is cyclically shifted according to one or more parameters.

6. The method of claim 1, further comprising selecting the plurality of precoders, wherein the plurality of precoders is a subset of a plurality of precoders utilized by a wireless device.

7. The method of claim 6, wherein the selecting includes selecting the plurality of precoders based at least in part on one or more communications parameters.

8. The method of claim 7, wherein the selecting includes selecting the plurality of precoders based on a cyclic prefix length or a presence of a sounding reference signal.

9. The method of claim 1, further comprising selecting a disparate precoder subsequent to the next precoder in the precoder sequence for precoding a retransmission of the next data symbol.

10. A wireless communications apparatus, comprising:
at least one processor configured to:
obtain a plurality of data symbols for transmitting over a wireless network;
precode one of the plurality of data symbols in a symbol period by using one of a plurality of precoders; and
determine a next precoder from the plurality of precoders specified in a precoder sequence for precoding a next data symbol of the plurality of data symbols in a next symbol period, wherein the precoder sequence specifies a pseudo-random order of the plurality of precoders; and
a memory coupled to the at least one processor.

11. The wireless communications apparatus of claim 10, wherein the precoder sequence specifies a sequential order of the plurality of precoders.

12. The wireless communications apparatus of claim 11, wherein the sequential order of the plurality of precoders is cyclically shifted according to one or more parameters.

13. The wireless communications apparatus of claim 10, wherein the pseudo-random order of the plurality of precoders is based at least in part on an identifier or one or more communications parameters of the wireless communications apparatus.

14. The wireless communications apparatus of claim 13, wherein the at least one processor is further configured to generate the precoder sequence based at least in part on the identifier or the one or more communications parameters of the wireless communications apparatus.

15. The wireless communications apparatus of claim 10, wherein the at least one processor is further configured to select the plurality of precoders as a subset of precoders present in the wireless communications apparatus.

16. The wireless communications apparatus of claim 15, wherein the at least one processor selects the plurality of precoders based at least in part on one or more communications parameters.

17. The wireless communications apparatus of claim 16, wherein the one or more communications parameters includes a cyclic prefix length or sounding reference signal presence.

18. The wireless communications apparatus of claim 10, wherein the at least one processor is further configured to determine a disparate precoder specified after the next precoder in the precoder sequence for precoding a retransmission of the next data symbol.

19. An apparatus for wireless communication, comprising:
means for obtaining a plurality of data symbols for transmitting over a wireless network;
means for precoding one of the plurality of data symbols in a symbol period by using one of a plurality of precoders; and
means for determining a next precoder from the plurality of precoders specified in a precoder sequence for precoding a next data symbol of the plurality of data symbols in a next symbol period, wherein the precoder sequence specifies a pseudo-random order of the plurality of precoders.

20. The apparatus of claim 19, wherein the precoder sequence specifies a sequential order of the plurality of precoders.

21. The apparatus of claim 20, wherein the sequential order of the plurality of precoders is cyclically shifted according to one or more parameters related to the apparatus.

22. The apparatus of claim 19, wherein the pseudo-random order of the plurality of precoders is based at least in part on an identifier or one or more communication parameters of the apparatus.

23. The apparatus of claim 22, further comprising means for generating the precoder sequence based at least in part on the identifier or the one or more communication parameters of the apparatus.

24. The apparatus of claim 19, further comprising means for selecting the plurality of precoders as a subset of precoders present in the apparatus.

25. The apparatus of claim 24, wherein the means for selecting selects the plurality of precoders according to one or more communications parameters.

26. The apparatus of claim 25, wherein the one or more communications parameters includes a cyclic prefix length or sounding reference signal presence.

27. The apparatus of claim 19, wherein the means for determining further determines a subsequent precoder after the next precoder in the precoder sequence for precoding a subsequent data symbol in a subsequent symbol period after the next symbol period.

28. The apparatus of claim 27, wherein the subsequent data symbol is a retransmission of the next data symbol.

29. A computer program product, comprising:
a tangible computer-readable medium comprising:
code for causing at least one computer to obtain a plurality of data symbols for transmitting over a wireless network;
code for causing the at least one computer to precode one of the plurality of data symbols in a symbol period by using one of a plurality of precoders; and
code for causing the at least one computer to determine a next precoder from the plurality of precoders specified in a precoder sequence for precoding a next data symbol of the plurality of data symbols in a next symbol period, wherein the precoder sequence specifies a pseudo-random order of the plurality of precoders.

30. The computer program product of claim 29, wherein the precoder sequence specifies a sequential order of the plurality of precoders.

31. The computer program product of claim 30, wherein the sequential order of the plurality of precoders is cyclically shifted according to one or more parameters.

32. The computer program product of claim 29, wherein the pseudo-random order of the plurality of precoders is based at least in part on an identifier or one or more communications parameters.

33. The computer program product of claim 32, wherein the computer-readable medium further comprises code for causing the at least one computer to generate the precoder sequence based at least in part on the identifier or the one or more communications parameters.

34. The computer program product of claim 29, wherein the computer-readable medium further comprises code for causing the at least one computer to select the plurality of precoders as a subset of precoders present in a wireless device.

35. The computer program product of claim 34, wherein the code for causing the at least one computer to select the plurality of precoders selects the plurality of available precoders based at least in part on one or more communications parameters.

36. The computer program product of claim 35, wherein the one or more communications parameters includes a cyclic prefix length or sounding reference signal presence.

37. The computer program product of claim 29, wherein the computer-readable medium further comprises code for causing the at least one computer to determine a disparate precoder specified after the next precoder in the precoder sequence for precoding a retransmission of the next data symbol.

38. A method of wireless communication, comprising:
receiving a plurality of data symbols for transmitting over a wireless network;
precoding one of the plurality of data symbols in a symbol period by using one of a plurality of precoders;
selecting a next precoder from the plurality of precoders specified in a precoder sequence for precoding a next data symbol of the plurality of data symbols in a next symbol period; and
selecting a disparate precoder subsequent to the next precoder in the precoder sequence for precoding a retransmission of the next data symbol.

39. The method of claim 38, further comprising determining the precoder sequence that specifies an order of the plurality of precoders based at least in part on an identifier or one or more communication parameters of a wireless device.

40. The method of claim 38, further comprising determining the precoder sequence that specifies a sequential order of the plurality of precoders.

41. The method of claim 38, further comprising selecting the plurality of precoders, wherein the plurality of precoders is a subset of a plurality of precoders utilized by a wireless device.

42. A wireless communications apparatus, comprising:
at least one processor configured to:
obtain a plurality of data symbols for transmitting over a wireless network;
precode one of the plurality of data symbols in a symbol period by using one of a plurality of precoders;
determine a next precoder from the plurality of precoders specified in a precoder sequence for precoding a next data symbol of the plurality of data symbols in a next symbol period; and
determine a disparate precoder specified after the next precoder in the precoder sequence for precoding a retransmission of the next data symbol; and
a memory coupled to the at least one processor.

43. The wireless communications apparatus of claim 42, wherein the at least one processor is further configured to determine the precoder sequence that specifies a sequential order of the plurality of precoders.

44. The wireless communications apparatus of claim 42, wherein the at least one processor is further configured to determine the precoder sequence that specifies an order of the plurality of precoders based at least in part on an identifier or one or more communications parameters of the wireless communications apparatus.

45. The wireless communications apparatus of claim 42, wherein the at least one processor is further configured to select the plurality of precoders as a subset of precoders utilized by the wireless communications apparatus.

46. An apparatus for wireless communication, comprising:
means for obtaining a plurality of data symbols for transmitting over a wireless network;
means for precoding one of the plurality of data symbols in a symbol period by using one of a plurality of precoders;
means for determining a next precoder from the plurality of precoders specified in a precoder sequence for precoding a next data symbol of the plurality of data symbols in a next symbol period; and
means for determining a disparate precoder specified after the next precoder in the precoder sequence for precoding a retransmission of the next data symbol.

47. The apparatus of claim 46, further comprising means for determining the precoder sequence that specifies a sequential order of the plurality of precoders.

48. The apparatus of claim 46, further comprising means for determining the precoder sequence that specifies an order of the plurality of precoders based at least in part on an identifier or one or more communication parameters of the apparatus.

49. The apparatus of claim 46, further comprising means for selecting the plurality of precoders as a subset of precoders utilized by the apparatus.

50. A computer program product, comprising:
a tangible computer-readable medium comprising:
code for causing at least one computer to obtain a plurality of data symbols for transmitting over a wireless network;
code for causing the at least one computer to precode one of the plurality of data symbols in a symbol period by using one of a plurality of precoders;
code for causing the at least one computer to determine a next precoder from the plurality of precoders specified in a precoder sequence for precoding a next data symbol of the plurality of data symbols in a next symbol period; and
code for causing the at least one computer to determine a disparate precoder specified after the next precoder in the precoder sequence for precoding a retransmission of the next data symbol.

51. The computer program product of claim 50, wherein the computer-readable medium further comprises code for causing the at least one computer to determine the precoder sequence that specifies a sequential order of the plurality of precoders.

52. The computer program product of claim 50, wherein the computer-readable medium further comprises code for causing the at least one computer to determine the precoder sequence that specifies an order of the plurality of precoders based at least in part on an identifier or one or more communications parameters of a wireless device.

53. The computer program product of claim 50, wherein the computer-readable medium further comprises code for causing the at least one computer to select the plurality of precoders as a subset of precoders utilized by a wireless device.

* * * * *